United States Patent
Marangi

(10) Patent No.: US 6,488,846 B1
(45) Date of Patent: Dec. 3, 2002

(54) PAINT SPRAYER FILTER SYSTEM

(76) Inventor: Rudy Marangi, 2526 Willowdale Dr., El Dorado Hills, CA (US) 95762

( * ) Notice: Subject to any disclaimer, the term of this patent is extended or adjusted under 35 U.S.C. 154(b) by 11 days.

(21) Appl. No.: 09/881,169

(22) Filed: Jun. 12, 2001

(51) Int. Cl.$^7$ .............................................. B01D 29/15
(52) U.S. Cl. ................... 210/232; 210/251; 210/416.1; 210/460; 210/483; 210/497.01; 210/499; 239/149; 239/331; 239/332; 239/525; 239/DIG. 14
(58) Field of Search ............................. 210/232, 251, 210/416.1, 459, 460, 483, 497.01, 499; 239/149, 331–333, 525, DIG. 14; 222/175, 608, 609

(56) References Cited

U.S. PATENT DOCUMENTS

| | | | | |
|---|---|---|---|---|
| 4,003,504 A | * | 1/1977 | Johnson et al. | 239/149 |
| 4,785,997 A | * | 11/1988 | Liska et al. | 239/332 |
| 4,878,930 A | | 11/1989 | Manniso et al. | 210/484 |
| D310,117 S | * | 8/1990 | Mariol | D23/225 |
| 5,252,210 A | | 10/1993 | Kessel | 210/452 |
| 5,567,323 A | | 10/1996 | Harrison, Jr. | 210/251 |
| D384,676 S | * | 10/1997 | Cyphers et al. | D15/7 |
| 5,725,364 A | * | 3/1998 | Mirazita | 417/44.2 |
| 5,769,321 A | * | 6/1998 | Cyphers | 239/154 |
| 5,842,639 A | | 12/1998 | Walker | 210/257 |
| 5,947,137 A | * | 9/1999 | Sheafer | 134/117 |
| 6,183,224 B1 | * | 2/2001 | Conatser | 239/332 |

* cited by examiner

Primary Examiner—Robert J. Popovics
(74) Attorney, Agent, or Firm—Thomas R. Lampe

(57) ABSTRACT

A paint sprayer filter system includes an intake tube having a rigid paint flow control and filter support frame connected to the open end thereof. A reusable filter is connected to the frame and surrounds the frame, the reusable filter being releasably connected to the frame to provide easy removal or attachment of the reusable filter.

16 Claims, 5 Drawing Sheets

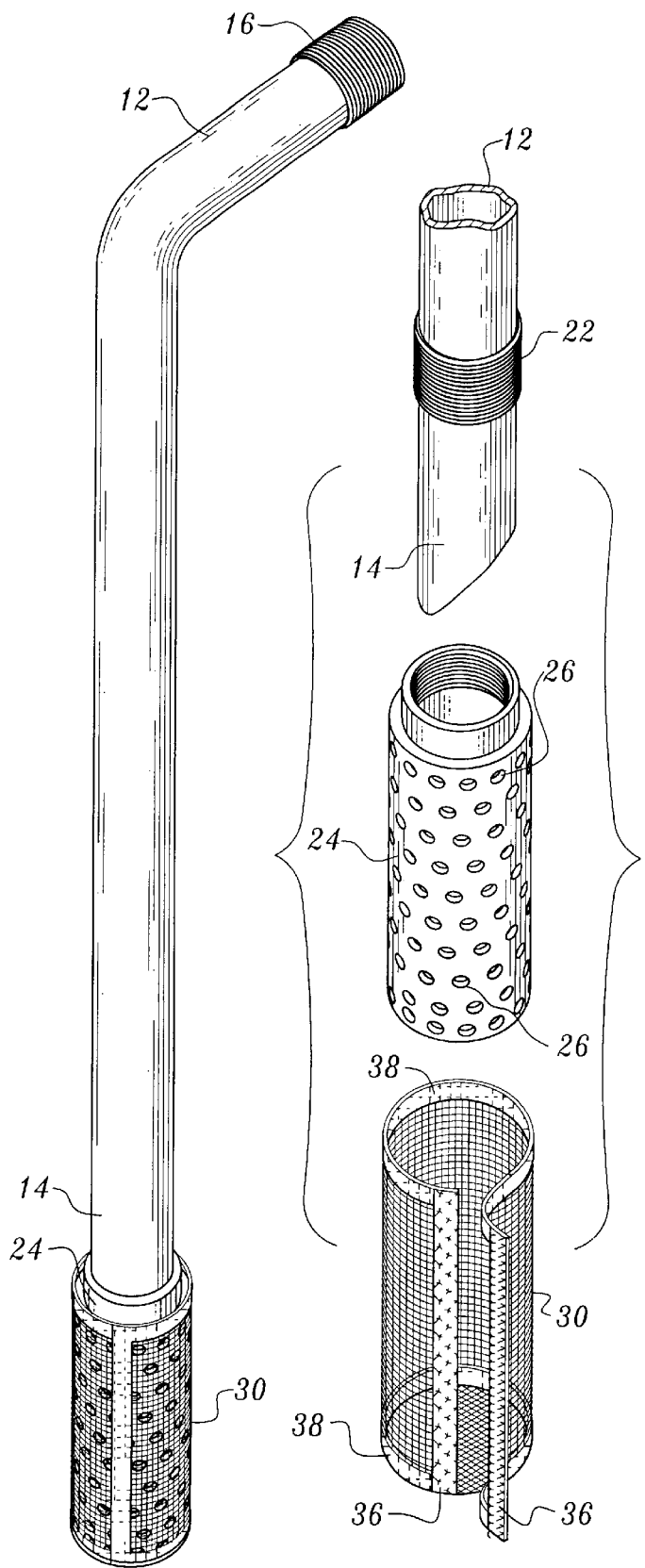
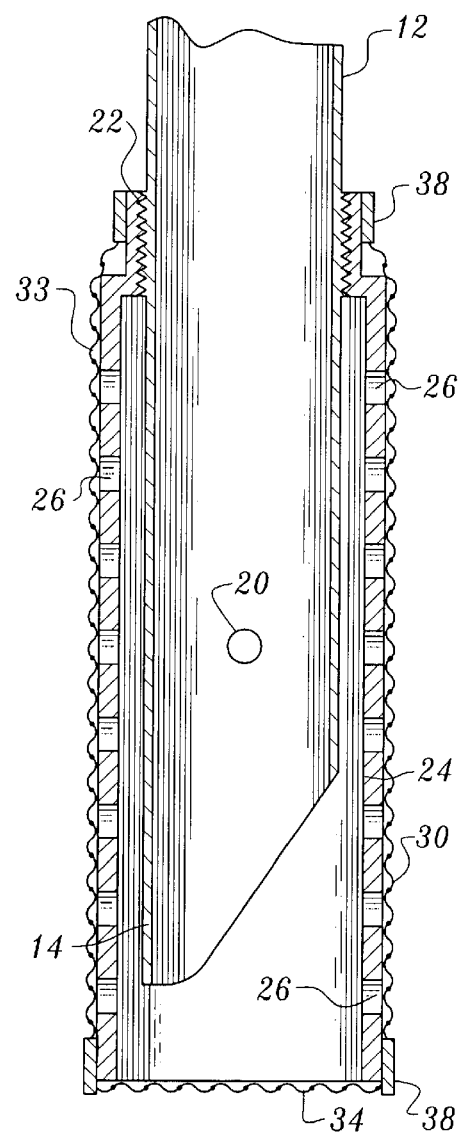
Fig. 2
Fig. 3
Fig. 4

PAINT SPRAYER FILTER SYSTEM

TECHNICAL FIELD

This invention relates to a filter system for paint sprayers. The invention is applicable, for example, to airless paint spraying systems.

BACKGROUND OF THE INVENTION

Airless paint spraying systems conventionally incorporate a pick-up or siphon tube which has a lower end positionable in a five gallon can or other container for paint. During operation the contents of the container are vacuum drawn up through the tube and pumped to a spray gun.

It is well known to position filters at the immersed ends of paint sprayer intake tubes to prevent debris in the paint from entering the tubes.

U.S. Pat. No. 5,567,323, issued Oct. 22, 1996, notes the common usage of multiple in-line filters to filter paint multiple times during the process of moving the paint from the paint container, through an airless spraying system, and onto a surface and/or object to be painted. Such filters frequently become clogged with debris, causing operating down-time to determine the location or locations of the clogs and eliminating them through replacement of the clogged filters.

As is also pointed out in the text of U.S. Pat. No. 5,567,323, it is known to employ a so-called rock catcher formed of a loose, heavy wire mesh at the intake of a sprayer, such device designed primarily to eliminate larger debris from the paint. It is known to cover the rock catcher with a fine mesh nylon net having a drawstring to secure to the rock catcher. Rock catchers of the type referenced in U.S. Pat. No. 5,567,323 become fouled quite readily and are difficult to remove from the intake tube when the paint dries. Furthermore, they do not operate to control flow of paint into the interior thereof where the sprayer intake is located. Such devices are also expensive. Fine mesh bags employed as covers detract from the efficiency of the sprayer, particularly in sprayers which rely on a vacuum to draw the paint into the intake tube. It will be appreciated that vacuum intakes of this type provide for a pressure differential on the paint entering the system that is limited to atmospheric pressure. Thus, a fine mesh net or bag will quickly impede paint flow and clog completely in many instances. This causes the airless sprayer to vaporize paint and become inoperative. Furthermore, fine mesh filter components or covers do not readily lend themselves to cleaning for reuse and can readily distort under pressure to enter openings of the rock catcher and clog them as well. The rock catcher and bag can fuse together and become difficult to separate, particularly when some paint drying has occurred. Also, drawstrings are notoriously difficult to untie or loosen when impregnated with paint and removal of the outer bag is desired, necessitating destruction of the bag in some cases so that it cannot be reused.

The intake filter which is the subject of U.S. Pat. No. 5,567,323 is of unitary construction, incorporating a filter element in the form of a very fine wire mesh formed into an accordian shape about the periphery thereof. The fine wire mesh accordianed filter is disposed about a rigid support having openings or apertures therein. End caps maintain the entire filter together as a unit. The text of U.S. Pat. No. 5,567,323 makes reference to the fact that the structure is such as to maintain the accordian shape of the accordian wire mesh 26 against the "about 2,000 to about 5,000 psi" pull of the airless paint sprayer pump with which the filter is associated. In reality, however, there are no forces of such magnitude applied at an intake of a airless paint sprayer since the maximum pressure on the paint is limited to atmospheric pressure. In such a situation, the use of a fine accordianed wire mesh in a filter as suggested by U.S. Pat. No. 5,567,323 will negatively impact operation of the device and result in plugging on a frequent basis. While the arrangement of U.S. Pat. No. 5,567,323 is alleged to be capable of being flushed out and cleaned for reuse, this is not a simple procedure and requires disassembling and reassembling multiple components of the unit.

It is also known to employ foraminous cups at the ends of intake tubes. These devices also foul quite readily and become deformed and damaged during use.

Other known arrangements are those of the following patents: U.S. Pat. No. 5,842,639, issued Dec. 1, 1998, U.S. Pat. No. 4,878,930, issued Nov. 7, 1989, and U.S. Pat. No. 5,252,210, issued Oct. 12, 1993. These patents do not teach or suggest the combination of structural elements and cooperative relationships disclosed and claimed herein.

DISCLOSURE OF INVENTION

The present invention relates to a filter system for paint sprayers characterized by its relative low cost, efficiency and effectiveness. The filter system incorporates a reusable filter that can be readily attached to or detached from a rigid paint flow control and filter support frame mounted at the distal or intake end of a paint sprayer intake tube. The frame and filter are cooperative when the filter is installed on the frame to remove debris from paint prior to drawing of the paint into the intake tube during the spraying operation. When cleaning is desired, the filter can be quickly detached from the frame and the cleaning operation carried out. Typically, cleaning is accomplished quite simply by applying water or other liquid to the separated frame and screen. Reinstallation of the filter is just as easy.

The combination of the system includes a paint sprayer intake tube having an intake tube open distal end for immersion in paint in a container. For the purposes of this application, the term "paint" is to be broadly construed and covers not only paint per se but also stains and other types of sprayable liquids.

The combination also includes a rigid frame attached to the paint sprayer intake tube. The rigid frame defines a frame interior communicating with the open distal end and having a peripheral wall defining a plurality of frame openings communicating with the frame interior.

A reusable filter surrounds the peripheral wall of the rigid frame and comprises a flexible screen releasably connected to the rigid frame. The screen defines screen openings in fluid flow communication with the frame openings. The screen openings are smaller than the frame openings.

The sizes of the screen openings and the frame openings fall within selected ranges.

The frame has a cylindrical configuration and the flexible screen is of non-accordianed construction, has a cylindrical configuration and further has an inner screen surface in face-to-face contact with the peripheral wall of the rigid frame over substantially the full extent of the peripheral wall of the frame.

The flexible screen includes screen edges and synthetic hook and eye connector strips are attached to the flexible screen at at least some of the edges, adjacent connector strips being in engagement to maintain the flexible screen in frictional engagement with the peripheral wall of the rigid frame to maintain the flexible screen in position on the rigid frame.

Other features, advantages and objects of the present invention will become apparent with reference to the following description and accompanying drawings.

BRIEF DESCRIPTION OF DRAWINGS

FIG. 2 is a perspective view of the intake tube, the rigid frame and filter connected together, the intake tube being detached from the rest of the paint sprayer;

FIG. 3 is an exploded, perspective view illustrating the lower portion of the intake tube, the rigid frame and the reusable filter prior to assembly thereof;

FIG. 4 is an enlarged, cross-sectional view of the lower portion of the intake tube having the rigid frame and reusable filter attached thereto;

MODES FOR CARRYING OUT THE INVENTION

Figure 1:
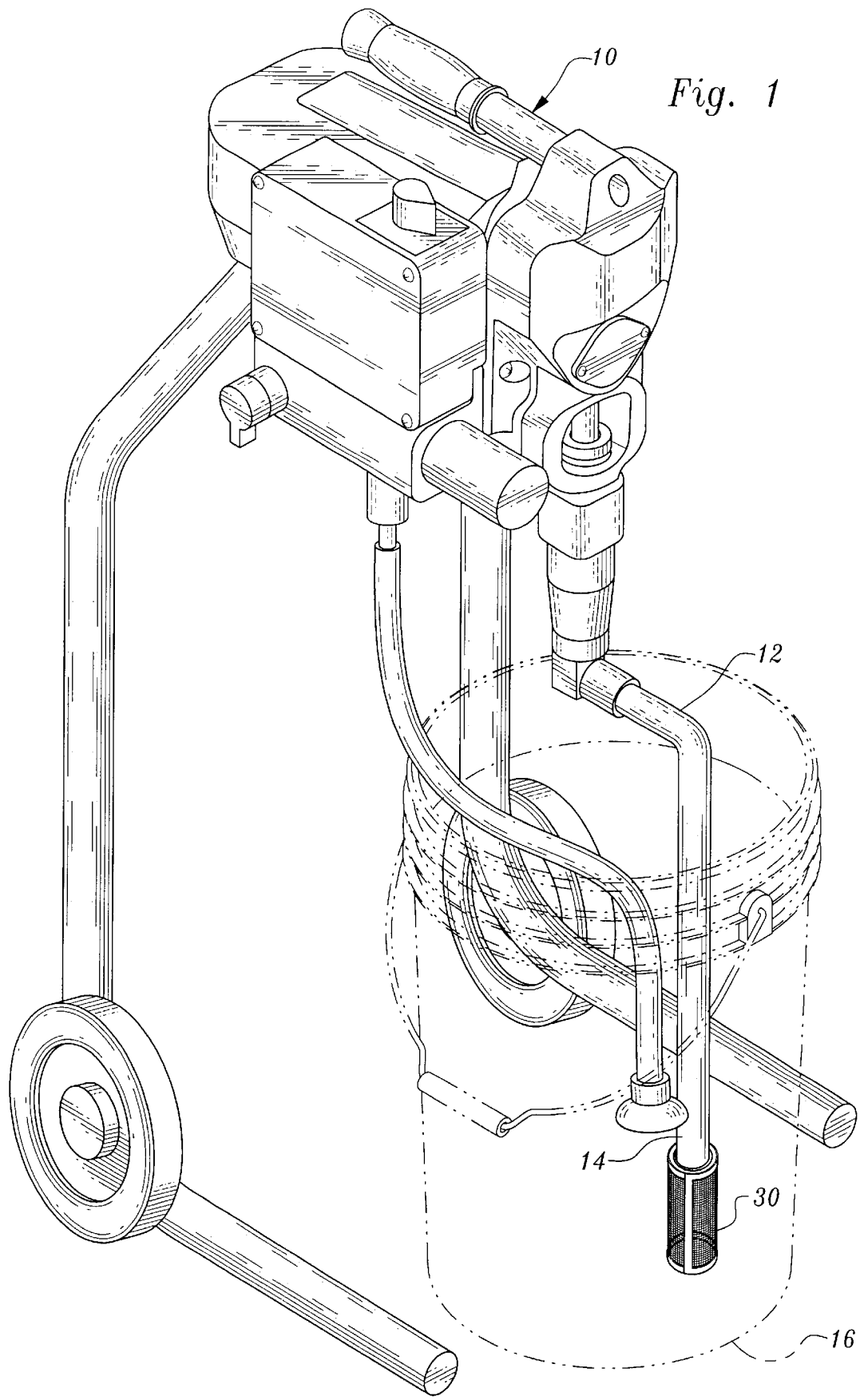
FIG. 1 is a perspective view illustrating an airless paint sprayer including an intake tube, the intake tube having its lower end positioned in a paint container, with a rigid frame and reusable filter constructed in accordance with the teachings of the present invention in the container interior.

Referring now with 1–4, a first embodiment of the invention is illustrated. FIG. 1 illustrates an airless paint sprayer 10 of conventional construction. Paint sprayer 10 includes, as is also conventional, an intake tube or siphon tube 12 having a lower distal end 14 positioned in the interior of a container 16 for paint. Threads 16 at the upper end of the intake tube are utilized to releasably secure the intake tube to the rest of the paint sprayer.

The lower end of the intake tube is open at the bottom thereof and the lower end is tapered, as shown, at the open end, this latter feature preventing complete closure of the intake tube if it were to inadvertently bottom out in the container. If desired, an auxiliary opening 20 may also be provided to allow continued flow of paint even if the bottom opening of the intake tube were obstructed in some manner.

A protrusion 22 having external threads therein radially extends outwardly from the rest of the sprayer intake tube adjacent to the open distal end thereof. The reduced size upper end of a rigid paint flow control and filter support frame 24 is secured to protrusion 22 by internal threads formed at the rigid frame upper end. The rigid frame below the upper end is cylindrically-shaped, with the cylindrical peripheral wall thereof spaced from the intake tube. That is, an annular space is formed between the rigid frame 24 and the lower portion of the intake tube 12. The distal or lower end of the intake tube is spaced from the bottom of the rigid frame when these components are assembled. The peripheral wall of the rigid frame defines a plurality of frame openings 26 communicating with the interior of the frame. In this embodiment of the invention the bottom or lower end of the rigid frame is completely open. The peripheral wall of the rigid frame has a smoothly curved outer surface and the rigid frame is formed of a material, such as stainless steel or other type of rigid metal or plastic, which is sturdy enough to resist bending or deformation of the frame upon impact. In the embodiment illustrated in FIGS. 1–4, the openings 26 are of the same size.

A reusable filter 30 surrounds the peripheral wall of the rigid paint flow control and filter support frame, the filter 30 comprising a flexible screen releasably connected to the rigid frame and defining screen openings in fluid flow communication with the frame openings. The screen openings are considerably smaller than the frame openings and have a size within a range of from about 0.0007 square inches to about 0.004 square inches. The flexible screen or filter 30 includes has a cup-shaped configuration and includes a cylindrical portion 32 and a bottom portion 34, both portions being made of the same material. Such material is a non-cloth, non-absorbent, non-accordianed material.

The screen comprises a matrix of interconnected synthetic screen elements of nylon or other suitable material which has sufficient rigidity to prevent deformation and entry of the interconnected synthetic screen elements into the frame openings under pressure exerted on the matrix by paint passing therethrough. Furthermore, the interconnected screen elements are sufficiently rigid to render the structure of the screen self-supporting and semi-rigid when the upper component or portion thereof forms a cylinder.

The filter 30 is held in place on the rigid frame 24 by tightening the cylindrical portion 32 against the rigid screen so that the inner screen surface is in face-to-face contact with the outer surface of the peripheral wall of the rigid frame over the full extent of the outer peripheral wall of the rigid frame. The frame controls the flow of paint flowing into the interior thereof. That is, the size, numbers and shapes of the frame openings dictate how much flow occurs upon application of a negative pressure in the frame interior by the airless sprayer. The flow can be varied for a given negative pressure by employing frames with greater or lesser numbers of frame openings or frame openings of larger or smaller sizes. For thicker paints, for example, the same flow rate as thinner or less viscous paints at a given negative pressure can be obtained by employing a frame with larger openings.

After the flexible screen has been manually tightened into frictional engagement with the frame, securement strips 36 located at edges of the cylindrical portion of the screen are brought together. The connector or securement strips 36 are synthetic hook and eye connector strips of the type, for example, sold under the trademark Velcro. Strips 38 are located at the top and bottom of the filter and these strips as well may be formed of synthetic hook and eye connector material. The cylindrical portion 32 is formed from a rectangular segment of screen while the bottom portion 34 is circular. Any suitable means may be employed to secure these cylindrical and bottom portions together.

It should be noted that the top of the filter is cinched in place with one of the reinforcement strips 38 disposed at the top end of the rigid frame which is reduced in size relative to the lower portion thereof. This prevents the filter 30 from slipping off the rigid frame unintentionally.

When cleaning of the screen is desired, it is a very simple matter to remove the filter from the rigid frame. This is done by manually separating the secured securement strips 36 and slipping the filter off of the rigid frame.

Figure 5:
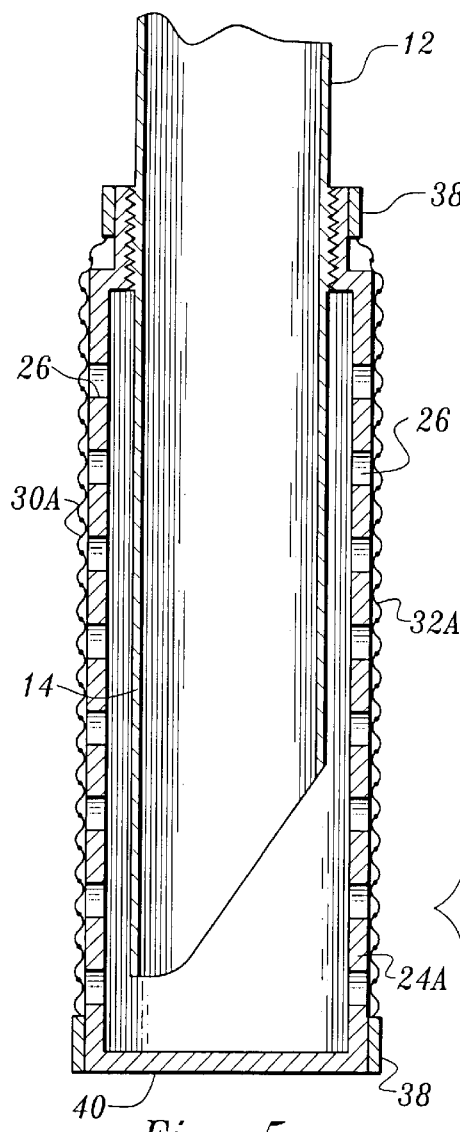
FIG. 5 is a view similar to FIG. 4, but illustrating an alternate embodiment of the invention.

FIG. 5 illustrates an alternate arrangement wherein a rigid frame 24A having an integral bottom 40 is employed. In this instance, the filter 30A does not have a bottom portion, but rather comprises just a cylindrical portion 32A. When the securement strips 36 of the filter are disengaged, the cylindrical shape of the filter can be changed to a flat rectangular shape upon application of manual force thereto. However, it is to be noted that when the filter 30A has a cylindrical shape and the securement strips thereof are secured together, the filter has sufficient structural rigidity to retain its cylindrical shape.

Figure 6B:
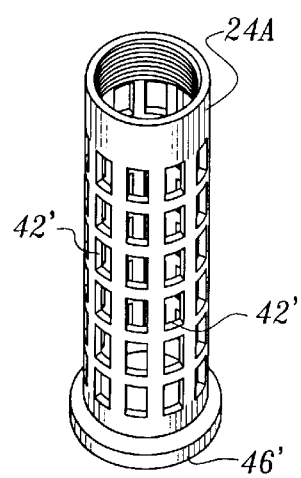
FIG. 6B is a perspective view of an alternative frame.
Figure 6A:
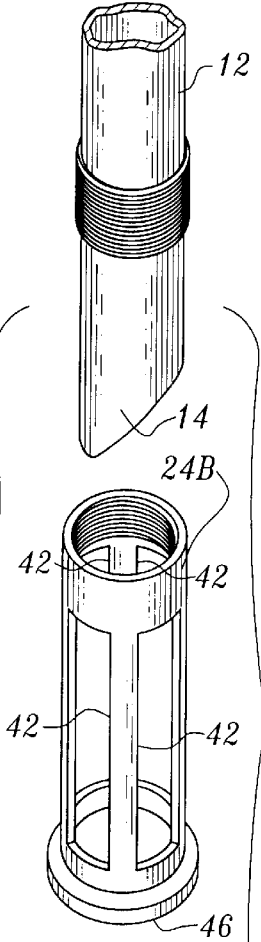
FIG. 6A is a view similar to FIG. 3, but illustrating a third embodiment of the invention.
Figure 7:
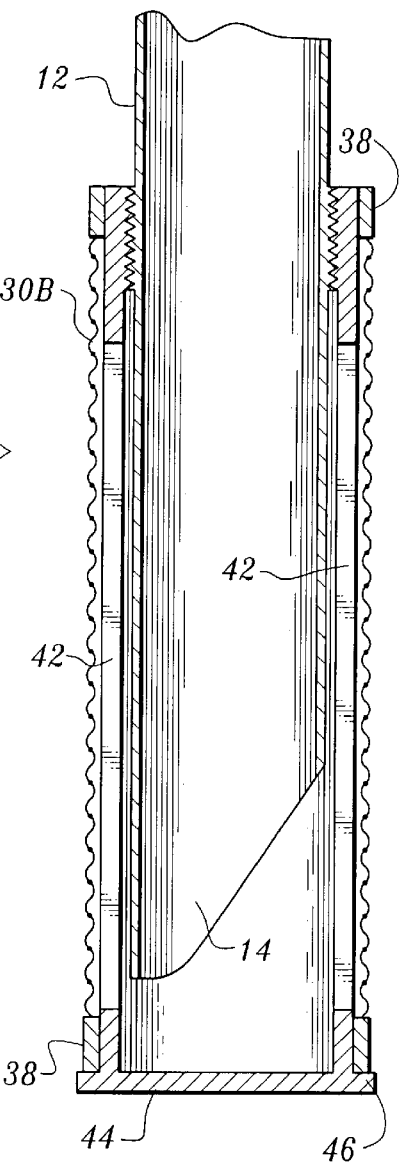
FIG. 7 is a view similar to FIGS. 4 and 5, but illustrating the third embodiment of the invention.

FIGS. 6A and 7 illustrate a third embodiment of the invention. In this embodiment, the rigid frame 24B has four elongated frame openings 42 formed therein. The rigid frame 24B has a closed bottom 44. The frame bottom or distal end 44 has an abutment member 46 radially projecting therefrom. The abutment member 46 is engaged by the bottom of reusable filter 30B to ensure that the filter will not inadvertently slip off the rigid frame. In this arrangement, the uppermost reinforcement strip 38 is located alongside and surrounds the unindented top end of the frame.

FIGS. 6B shows a frame 24B' which could be substituted for frame 24B in the arrangement of FIG. 6A and having smaller holes 42'. Use of frame 24B' would be appropriate when the flow rate of a thinner or less viscous paint is to approximate that of a thicker or more viscous paint passing through the holes 42 of frame 24B.

Figure 8:
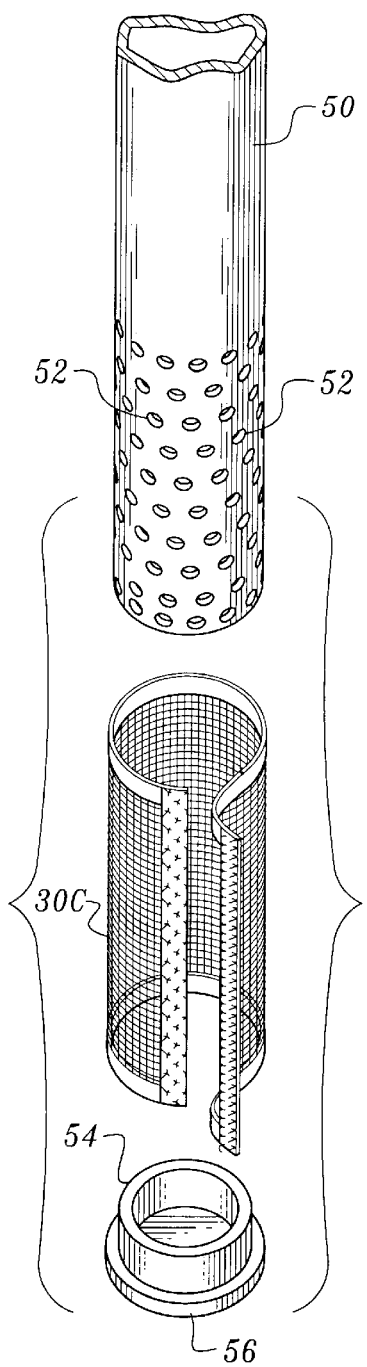
FIG. 8 is a view similar to FIGS. 3 and 6, but illustrating a fourth embodiment of the invention.
Figure 9:
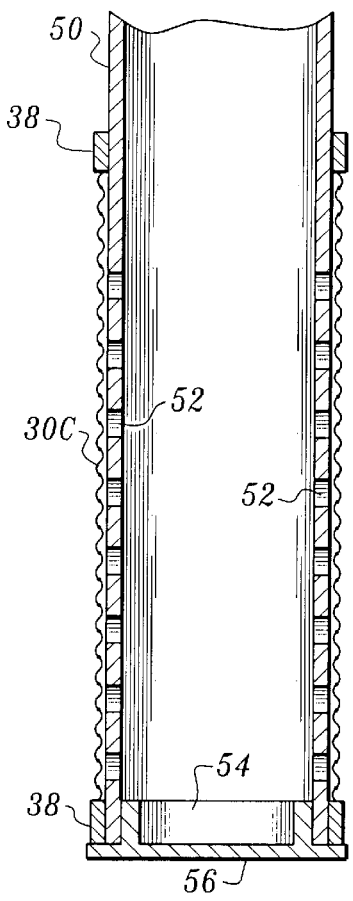
FIG. 9 is a view similar to FIGS. 4, 5 and 7, but illustrating the fourth embodiment of the invention.

FIGS. 8 and 9 show another embodiment of the invention. In this embodiment, the rigid frame is integral with and forms an extension of intake tube 50. The frame defines a plurality of frame openings 52. The lower or bottom end of the rigid frame is open and receives therein an end cap 54 which is secured to the rigid frame by any suitable expedient such as friction fit, threads, etc. The end cap has a radially projecting abutment member 56 formed thereon which is engaged by the lower end of the filter 30C. This provides a positive means for keeping the filter 30C from slipping off of the rigid frame.

Figure 10:
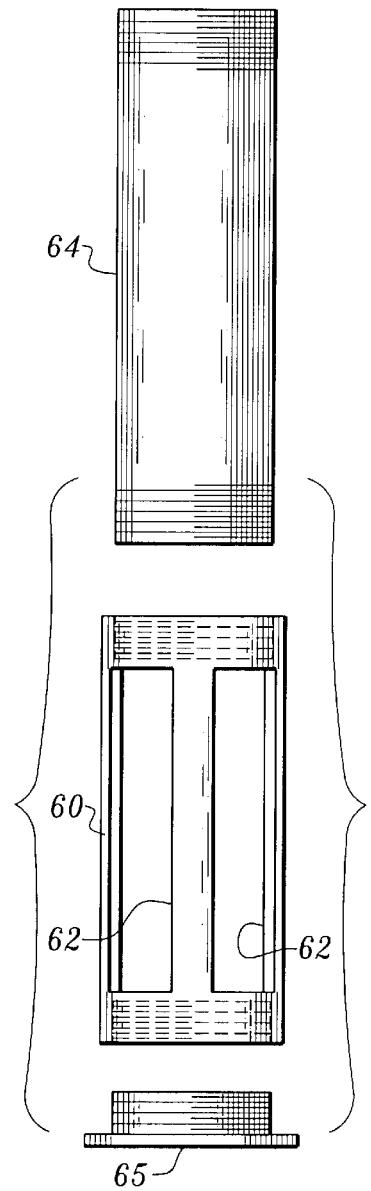
FIG. 10 is an exploded elevational view of selected components of a fifth embodiment of the invention.

FIG. 10 shows an embodiment wherein a frame 60 is threaded at both ends to threadedly engage an exterior pipe 64 and a closure or cap 65. The upper end of extension pipe 64 can be attached to threads at the end of an airless sprayer intake tube (not shown).

Figure 11:
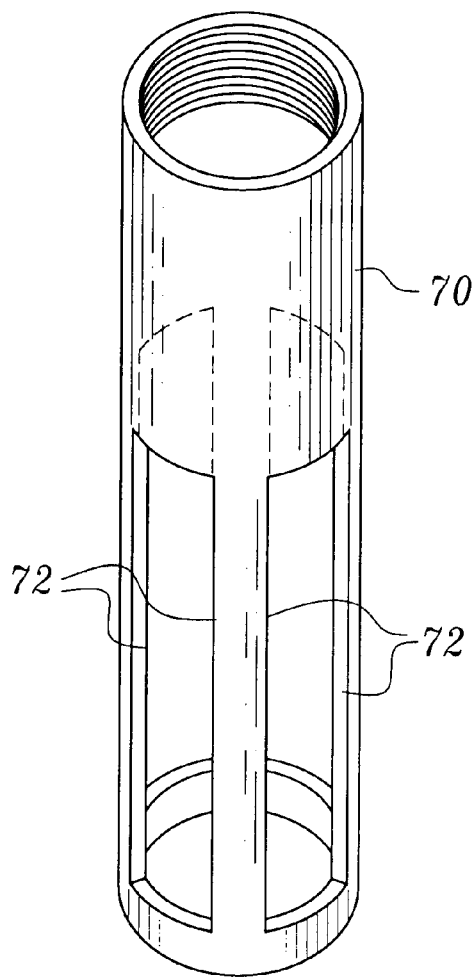
FIG. 11 is a perspective view of an alternative form of frame having an open bottom.
Figure 12:
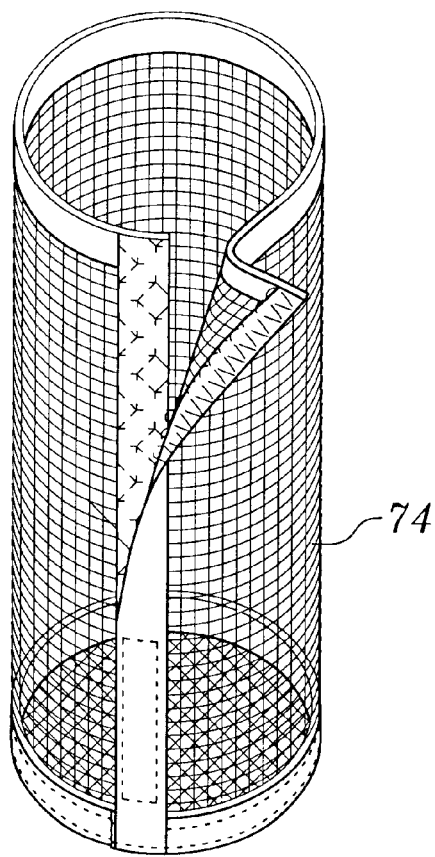
FIGS. 12 and 13 are respectively perspective and bottom views of a filter for use with the frame of FIG. 11.
Figure 13:
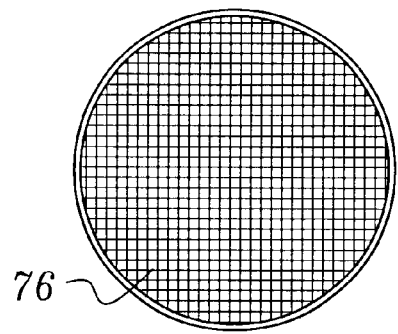

FIGS. 11–13 show another embodiment wherein the frame 70 having openings 72 is open at the bottom end. A filter 74 having a closed end 76 is secured over the frame 70 similar to the arrangement shown in FIGS. 1–4.

The invention claimed is:

1. In combination:

a spray gun;

a paint sprayer intake tube having an intake tube open distal end for immersion in paint in a container;

a pump for receiving paint from said paint sprayer intake tube for delivery to said spray gun;

a rigid paint flow control and filter support frame attached to said paint sprayer intake tube, said rigid paint flow control filter support frame defining a frame interior communicating with said open distal end and having a peripheral wall defining a plurality of frame openings communicating with said frame interior for controlling the flow of paint into said interior, said peripheral wall having a generally smooth outer peripheral surface;

a reusable filter surrounding the peripheral wall of said rigid paint flow control and filter support frame, said reusable filter comprising a flexible screen releasably connected to said rigid frame paint flow control and filter support frame and defining screen openings in fluid-flow communication with said frame openings, said screen openings being smaller than the frame openings and said screen being in engagement with the generally smooth outer peripheral surface, said rigid paint flow control and filter support frame having a generally cylindrical configuration and said flexible screen being of non-accordianed construction, having a generally cylindrical configuration and further having an inner screen surface in face-to-face contact with the generally smooth outer peripheral surface of said rigid paint flow control and filter support frame over substantially the full extent of the peripheral wall of said rigid paint flow control and filter support frame, said flexible screen including screen edges; and synthetic hook and eye connector strips attached to said flexible screen at at least some of said edges, adjacent connector strips being in engagement with the generally smooth outer peripheral surface of the peripheral wall of said rigid paint flow control and filter support frame to maintain the flexible screen in position on the rigid paint flow control and filter support frame.

2. The combination according to claim 1 wherein said screen openings have a size within a range of from about 0.0007 square inches to about 0.004 square inches.

3. The combination according to claim 2 wherein said screen openings are substantially uniform in size.

4. The combination according to claim 1 wherein said flexible screen is non-cloth and comprises a matrix of interconnected synthetic screen elements of sufficient rigidity to prevent deformation and entry of said interconnected synthetic screen elements into said frame openings under pressure exerted on the matrix by paint passing therethrough and rendering the structure of said flexible screen self-supporting and semi-rigid when said flexible screen assumes a cylindrical shape.

5. The combination according to claim 4 wherein said interconnected synthetic screen elements are formed of non-absorbent material.

6. The combination according to claim 5 wherein said non-absorbent material is nylon.

7. The combination according to claim 1 including releasable attachment means releasably attaching said rigid paint flow control and filter support frame to said paint sprayer intake tube.

8. The combination according to claim 7 wherein said releasable attachment means comprises threads on said paint sprayer intake tube adjacent to said open distal end and threads on said rigid paint flow control and filter support frame engaging the threads on said paint sprayer intake tube.

9. The combination according to claim 8 wherein said paint sprayer intake tube includes a radially extending protrusion adjacent to said open distal end, the threads of said paint sprayer intake tube being formed on said protrusion.

10. The combination according to claim 1 wherein said rigid paint flow control and filter support frame includes an open frame distal end and wherein said flexible screen additionally includes a screen bottom portion disposed under said open frame distal end.

11. The combination according to claim 1 wherein said paint sprayer intake tube distal end is tapered.

12. The combination according to claim 11 wherein said paint sprayer intake tube defines at least one paint intake hole spaced from said open distal end.

13. The combination according to claim 1 wherein said rigid paint flow control and filter support frame includes a frame distal end, said combination additionally comprising a radially projecting abutment member at said frame distal end and engageable by said reusable filter to maintain said reusable filter in a predetermined position on said rigid paint flow control and filter support frame.

14. The combination according to claim 13 wherein said frame distal end comprises an end cap, said radially projecting abutment member being integral with said end cap.

15. The combination according to claim 1 wherein said open distal end is surrounded by and spaced from said rigid paint flow control and filter support frame to define an annular space in said frame interior.

16. The combination according to claim 1 wherein said rigid paint flow control and filter support frame is releasably connected to said paint sprayer intake tube and comprises one of a plurality of interchangeable rigid paint flow control and filter support frames having different opening sizes or shapes for modifying paint flow to the paint sprayer intake tube.

* * * * *